(12) United States Patent
Ayanambakkam et al.

(10) Patent No.: US 12,175,694 B2
(45) Date of Patent: Dec. 24, 2024

(54) MANAGEMENT OF TUBULAR STORAGE IN A FINGERBOARD USING A VISION SYSTEM

(71) Applicant: Nabors Drilling Technologies USA, Inc., Houston, TX (US)

(72) Inventors: Arima Ayanambakkam, Spring, TX (US); Pradeep Annaiyappa, Houston, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 1233 days.

(21) Appl. No.: 16/897,650

(22) Filed: Jun. 10, 2020

(65) Prior Publication Data

US 2020/0394779 A1    Dec. 17, 2020

Related U.S. Application Data

(60) Provisional application No. 62/860,057, filed on Jun. 11, 2019.

(51) Int. Cl.

| | |
|---|---|
| *G06T 7/00* | (2017.01) |
| *E21B 19/06* | (2006.01) |
| *E21B 19/14* | (2006.01) |
| *E21B 19/15* | (2006.01) |
| *G06F 18/22* | (2023.01) |

(Continued)

(52) U.S. Cl.
CPC ............... *G06T 7/62* (2017.01); *E21B 19/06* (2013.01); *E21B 19/14* (2013.01); *G06F 18/22* (2023.01); *G06T 7/001* (2013.01); *G06T 7/70* (2017.01); *G06T 7/80* (2017.01); *G06V 20/647* (2022.01); *H04N 7/18* (2013.01); *E21B 19/155* (2013.01); *G06T 2207/30164* (2013.01)

(58) Field of Classification Search
CPC .. G06T 7/62; G06T 7/001; G06T 7/70; G06T 7/80; G06T 2207/30164; E21B 19/06; E21B 19/14; G06F 18/22; H04N 7/18
See application file for complete search history.

(56) References Cited

U.S. PATENT DOCUMENTS

| | | |
|---|---|---|
| 9,322,950 B2 | 4/2016 | Gustavsson et al. |
| 10,246,952 B2 | 4/2019 | Trydal et al. |

(Continued)

FOREIGN PATENT DOCUMENTS

| | | |
|---|---|---|
| CA | 2870659 C | 5/2018 |
| GB | 2556111 A | 5/2018 |

*Primary Examiner* — Bijan Mapar
(74) *Attorney, Agent, or Firm* — Abel Schillinger, LLP

(57) ABSTRACT

A fingerboard management system that can determine via a rig controller, a selection of a location in the fingerboard for one or more tubulars and placement of the one or more tubulars in the fingerboard based on available locations in the fingerboard and historical information of each of the one or more tubulars and a method that can include importing a 3D model into a rig controller, collecting images of at least a portion of the rig, comparing the images to the 3D model or a visible marker, calibrating the vision system by determining a position, an orientation, and a field of view for each of the sensors based on the comparing, collecting additional images of the fingerboard, and determining an available total tubular storage space of the fingerboard based on the additional images of the fingerboard and the calibrated vision system.

20 Claims, 8 Drawing Sheets

(51) Int. Cl.
*G06T 7/62* (2017.01)
*G06T 7/70* (2017.01)
*G06T 7/80* (2017.01)
*G06V 20/64* (2022.01)
*H04N 7/18* (2006.01)

(56) References Cited

U.S. PATENT DOCUMENTS

| | | | |
|---|---|---|---|
| 2013/0275100 A1* | 10/2013 | Ellis | E21B 19/20 |
| | | | 703/2 |
| 2014/0233804 A1 | 8/2014 | Gustavsson et al. | |
| 2015/0232272 A1* | 8/2015 | Magnuson | E21B 19/14 |
| | | | 700/217 |
| 2016/0060980 A1* | 3/2016 | Magnuson | E21B 19/14 |
| | | | 414/21 |
| 2016/0130889 A1 | 5/2016 | Torrione | |
| 2018/0226283 A1 | 8/2018 | Amanullah | |
| 2019/0226287 A1* | 7/2019 | Trydal | G06V 10/10 |

* cited by examiner

MANAGEMENT OF TUBULAR STORAGE IN A FINGERBOARD USING A VISION SYSTEM

CROSS REFERENCE TO RELATED APPLICATION(S)

This application claims priority under 35 U.S.C. § 119(e) to U.S. Patent Application No. 62/860,057, entitled "MANAGEMENT OF TUBULAR STORAGE IN A FINGERBOARD USING A VISION SYSTEM," by Arima AYANAMBAKKAM and Pradeep ANNAIYAPPA, filed Jun. 11, 2019, which application is assigned to the current assignee hereof and incorporated herein by reference in its entirety.

BACKGROUND

Embodiments of the present disclosure relate generally to the field of drilling and processing of wells. More particularly, present embodiments relate to a system and method for controlling subterranean operations using inputs from an imaging system.

Management of tubulars in the fingerboard and in the wellbore have conventionally been a manual activity with the driller entering in his tally book, the tubular details of each stand going into the well and also the details of the tubulars that are stored in the fingerboard. There exists systems that allow the driller to record this information manually as a means to track the progression of the well and also methods to track this information when there exists a pipe handling system. At least one problem with the manual entry is that it can be tedious for the driller to enter this information in real-time and doing so can cause the driller to deviate from drilling the wellbore. In the case of automated pipe handling systems, the burden on the driller may be eased with the automated pipe handling but entering the information can become even more critical since the information for each tubular may be used by a pipe handler system when gripping, positioning, and releasing the tubulars. Therefore, improvements in fingerboard management storage systems are continually needed.

SUMMARY

One general aspect includes a method for managing tubular storage in a fingerboard on a rig that can include determining, via a rig controller, a selection of a location in the fingerboard for one or more tubulars and placement of the one or more tubulars in the fingerboard based on available locations in the fingerboard and historical information of each of the one or more tubulars.

Another general aspect includes a method of managing tubular storage in a fingerboard that can include importing a 3D model of a rig into a rig controller; collecting, via sensors of a vision system, one or more first images of at least a portion of the rig; comparing the first images, via the rig controller, to the 3D model; calibrating the vision system by determining, via the rig controller, a position, an orientation, a field of view, or combinations thereof for each of the sensors based on the comparing; collecting, via the sensors, one or more second images of at least a portion of the rig, with the second images comprising images of the fingerboard; and finally, determining, via the rig controller, an available total tubular storage space of the fingerboard based on the images of the fingerboard and the calibrated vision system.

Another general aspect includes a method of handling tubulars on a rig having a fingerboard for tubular storage, where the method can include importing a 3D model of the rig into a rig controller; collecting, via sensors of a vision system, one or more first images of at least a portion of the rig; comparing the first images, via the rig controller, to the 3D model; calibrating the vision system by determining, via the rig controller, a position, an orientation, a field of view, or combinations thereof for each of the sensors based on the comparing; collecting, via the sensors, one or more second images of at least a portion of the rig, with the second images comprising images of a first tubular; calculating, via the rig controller, parameters of the first tubular based on the second images and the calibrated vision system; determining a type of the first tubular based on the parameters of the first tubular; determining a storage location in the fingerboard for the first tubular based on the type of the first tubular; and storing the first tubular in the storage location.

Another general aspect includes a system for managing tubular storage in a fingerboard during a subterranean operation, the system comprising: a rig; the fingerboard configured to store one or more tubulars in one or more slots of the fingerboard during the subterranean operation; a vision system with one or more sensors that collect images of at least a portion of the rig; and a rig controller comprising one or more processors, and one or more non-transitory, computer-readable media having executable instructions stored thereon, the executable instructions comprising instructions that: instruct the vision system to collect one or more first images of at least a portion of the rig; instruct the one or more processors to perform a comparison of the first images to a 3D model of the rig; instruct the one or more processors to calibrate the vision system by determining a position, an orientation, a field of view, or combinations thereof for each of the sensors based on the comparison; instruct the vision system to collect one or more second images of at least a portion of the rig, with the second images comprising images of the fingerboard; and instruct the one or more processors to determine an available total tubular storage space of the fingerboard based on the images of the fingerboard and the calibrated vision system.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

Unless otherwise defined, all technical and scientific terms used herein have the same meaning as commonly understood by one of ordinary skill in the art to which this invention belongs. The materials, methods, and examples are illustrative only and not intended to be limiting.

Figure 1A:
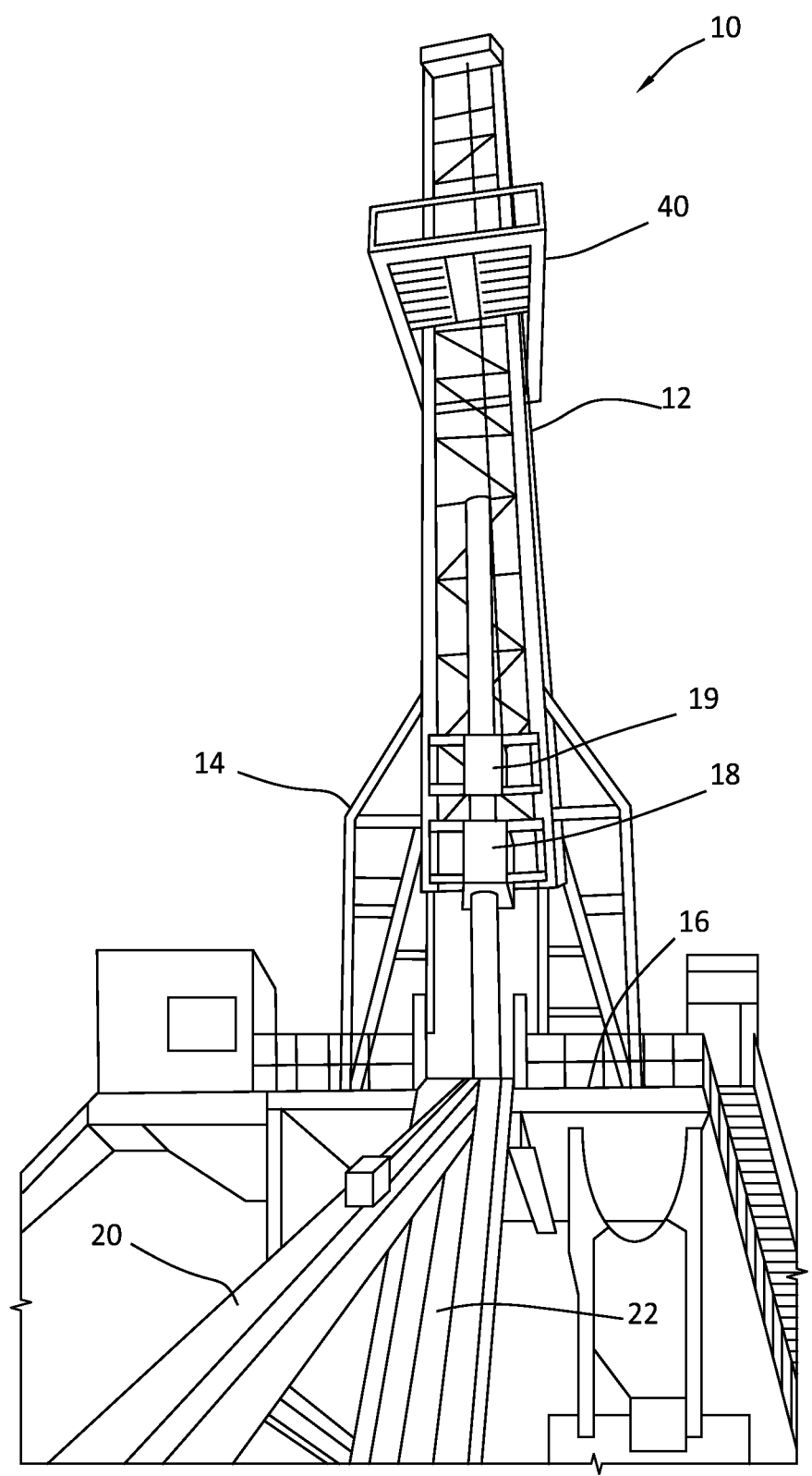
FIG. 1A is a representative side view of a rig being utilized for a subterranean operation (e.g. drilling a wellbore) with a fingerboard for vertical storage of tubulars, in accordance with certain embodiments.

FIG. 1A is a schematic view of a rig 10 in the process of a subterranean operation in accordance with certain embodiments which may require providing tubulars to and removing tubulars from a fingerboard 40 of the rig 10. In this example, the rig 10 is in the process of drilling a wellbore, but the current embodiments are not limited to a drilling operation. The rig 10 can also be used for other operations such as completion, production, recovery, well killing operations, etc. The rig 10 features an elevated rig floor 16 and a derrick 14 extending above the rig floor 16. A traveling block 19 is configured to hoist various types of drilling equipment above the rig floor 16, such as a top drive 18. A mast 12 of the derrick 14 extends above the rig floor 16 and can provide rotational stability to the top drive 18 as well as support for the fingerboard 40. A catwalk 20 can be used to transfer tubulars between a horizontal storage area and the rig floor 16. The catwalk 20 is shown after it has traveled up a V-door ramp 22 to the V-door at the rig floor 16. A pipe handler (such as an elevator attached to the top drive 18, a pipe handler attached to the derrick, manually assisted pipe handling equipment, manual manipulations of pipes, etc.) can be used to transfer the tubulars between the catwalk 20, the fingerboard, the mousehole, the wellbore, as well as other locations on or off the rig 10. For example, the pipe handler can retrieve a tubular from the catwalk 20, transfer it to the fingerboard 40 for storage in a vertical location in the fingerboard 40. For example, the pipe handler can retrieve the tubular from the catwalk 20, transfer the tubular to a mousehole for building a tubular stand with multiple tubular segments. For example, the pipe handler can retrieve the tubular stand from the mousehole and transfer it to the fingerboard 40 for vertical storage.

Figure 1B:
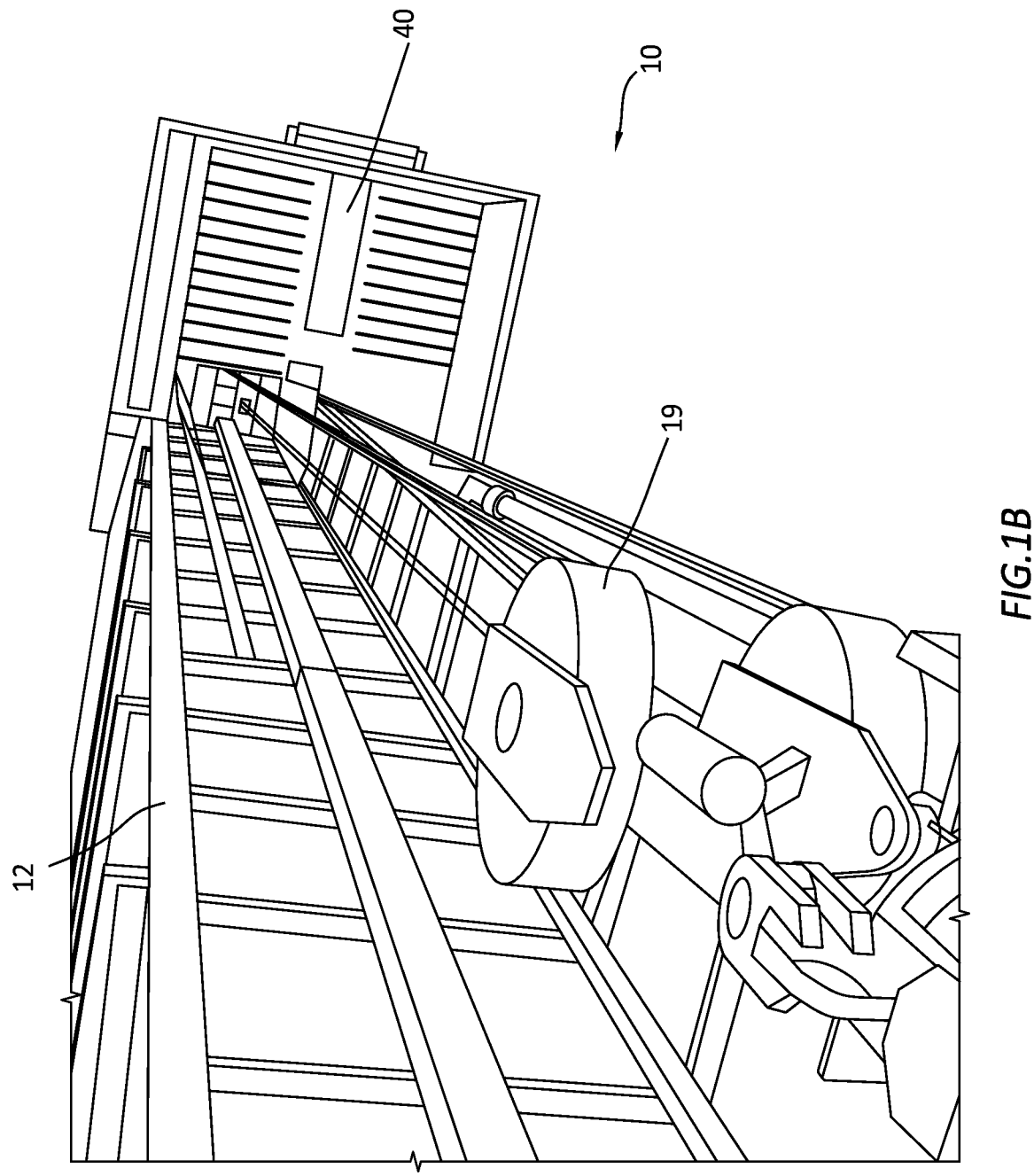
FIG. 1B is a representative perspective view of a bottom side of the fingerboard of the rig of FIG. 1A, in accordance with certain embodiments.

FIG. 1B is a representative perspective view of a bottom side of the fingerboard of the rig 10 of FIG. 1A, in accordance with certain embodiments. The fingerboard 40 can have storage slots formed by protruding fingers. This example fingerboard 40 has two rows of storage slots, with the protruding fingers of each row extending toward each other with a walk platform positioned in between the two rows. This platform can be used by personnel to manually maneuver tubulars into and out of the fingerboard storage. The fingerboard 40 can be bordered by a structure that helps prevent tubulars from tilting over and falling out of the fingerboard 40 as they are being retrieved from or installed in the fingerboard storage locations.

Figure 2:
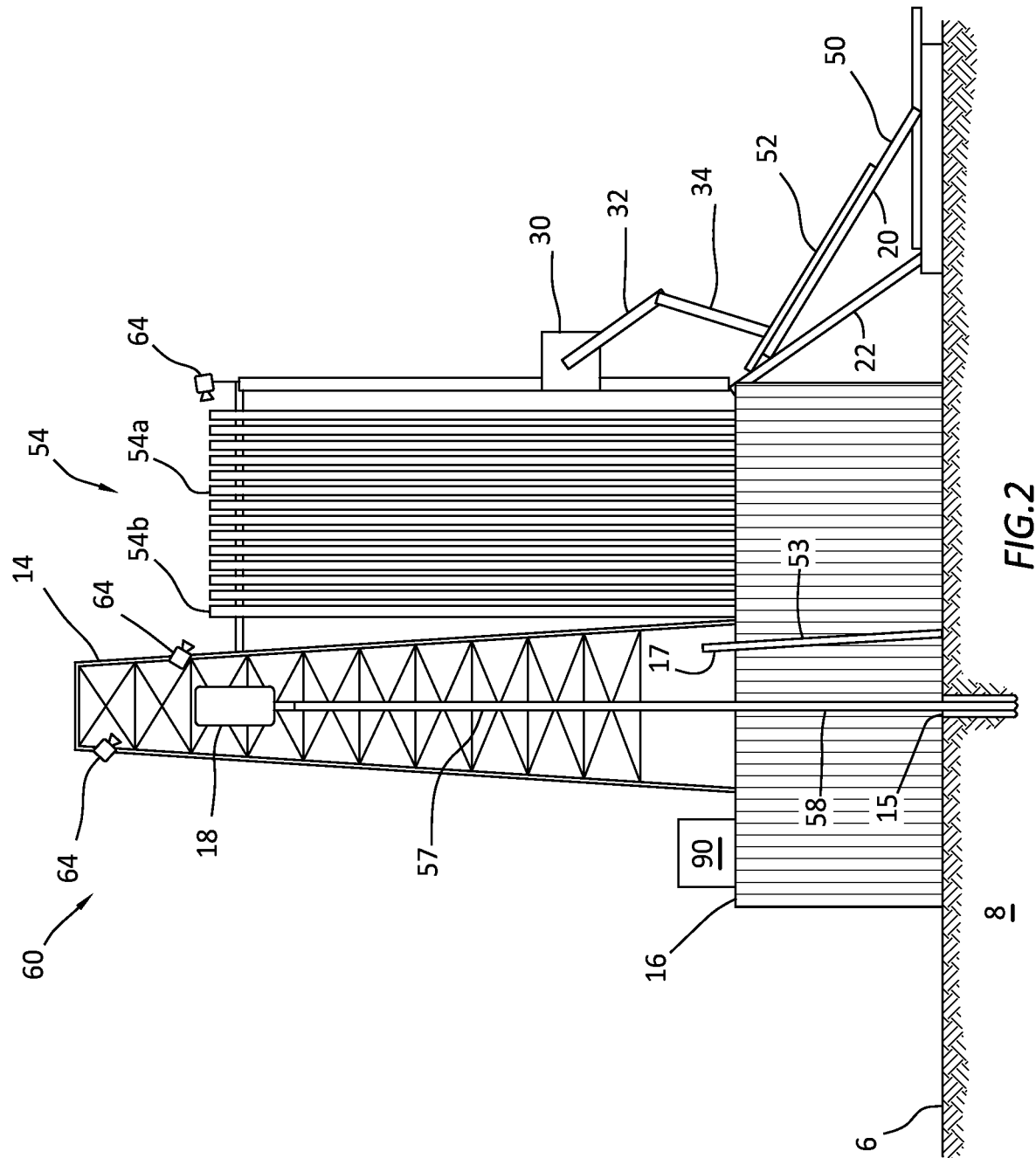
FIG. 2 is a representative simplified side view of a rig being utilized for a subterranean operation (e.g. drilling a wellbore), in accordance with certain embodiments.

FIG. 2 is a representative simplified side view of a rig being utilized for a subterranean operation (e.g. drilling a wellbore), in accordance with certain embodiments. The rig 10 can include a derrick 14 extending up from the rig floor 16. The derrick 14 can provide support for hoisting the top drive 18 as needed to manipulate tubulars. A catwalk 20 and V-door ramp 22 can be used to transfer horizontally stored tubular segments 50 to the rig floor 16. A tubular segment 52 can be one of the horizontally stored tubular segments 50 that is being transferred to the rig floor 16. A pipe handler 30 with articulating arms 32, 34 can be used to grab the tubular segment 52 from the catwalk 20 and transfer the tubular segment 52 to the top drive 18, the mousehole 17, the fingerboard 40, or the wellbore 15. The pipe handler 30 can include any equipment used (e.g. equipment manually operated, autonomously operated, combinations thereof, etc.) for manipulating the tubulars around the rig 10. As used herein, "tubular" refers to an elongated cylindrical tube and can include any of the tubulars manipulated around the rig 10, such as tubular segments 50, 52, 53, tubular stands 54, 57, and tubular string 58, but not limited to the tubulars shown in FIG. 2. Therefore, "tubular" is synonymous with "tubular segment," "tubular stand," and "tubular string," as well as "pipe," "pipe segment," "pipe stand," and "pipe string."

The pipe handler 30 is shown with articulating arms 32, 34, but the pipe handler 30 does not require two articulating arms 32, 34. There can be more or fewer arms 32, 34 for manipulating tubulars on the rig 10, with an arm being anything that operates to grab, move, or release the tubular around the rig 10. The one or more arms can be links connected to a top drive 18, such as an elevator connected to the top drive 18 via a link pair. The tubular string 58 can extend into the wellbore 15, with the wellbore 15 extending through the surface 6 into the subterranean formation 8. A tubular stand 57 can be coupled to or uncoupled from the tubular string 58. If tubular 57 is being coupled to the tubular string 58, then the tubular 57 could have been transported from the fingerboard 40 to the wellbore 15 via the pipe handler 30. The tubular 57 may have been stored in a storage location in the fingerboard 40 awaiting retrieval by the pipe handler 30. If tubular 57 is being uncoupled from the tubular string 58, the pipe handler 30 can retrieve the tubular 57 from the top drive 18 and transport the tubular 57 to a storage location in the fingerboard 40. A desired location in the fingerboard 40 can be selected based on parameters of the tubular 57, as well as historical data that captures how the tubular 57 has been utilized. This will be described in more detail below, regarding historical data being used to determine storage locations in the fingerboard 40 and retrieval of the tubular 57 from the fingerboard 40 for continued utilization. When the tubular 57 is stored in the fingerboard 40, it can also be referred to as a tubular 54, 54*a*, or 54*b*.

A vision system 60 can include multiple imaging sensors 64 positioned at various locations around the rig 10. The imaging sensors 64 can collect images from the various locations on the rig 10 and transmit the images to a rig controller 90 for processing. The rig controller 90 can be configured to use the collected images to manage the storage and retrieval of tubulars 54 in the fingerboard 40. At least one or more of the imaging sensors 64 can be directed at the fingerboard 40 to provide visibility of tubulars 54 going into and out of the fingerboard 40, as well as visibility of storage locations of the fingerboard 40. The rig controller 90 can process images received from the sensors 64 to determine which storage locations of the fingerboard 40 are occupied by a tubular 54, and which storage locations are available for storing a tubular 54. The rig controller 90 can process the images to determine parameters of each tubular 54 and log these parameters for each tubular 54. Where the parameters can include a presence or absence of a box end of the tubular 54, a length of the box end when the box end is present, a diameter of the box end when the box end is present, a diameter of a body portion of the tubular 54, a presence or absence of a sub attached at an end of the tubular 54, a length of the sub when the sub is present, a diameter of each end of the sub when the sub is present, a diameter of a body of the sub when the sub is present, a height of the tubular 54 (including the sub if present) above the fingerboard, an overall length of the tubular 54, cleanliness, visible markers (e.g. markers to indicate information about the tubular 54). The parameters of the tubular 54 can be used by the rig controller 90 to determine the type of each tubular 54 (e.g., a tubular type can be casing, drill pipe, drill collar, tubular stand including a tool, etc.) The rig controller 90 can use the logged parameters and logged type of the tubular 54 to determine a storage location for the tubular 54 in the fingerboard 40.

The rig controller 90 can log historical information for each one of the tubulars 54 as the tubulars 54 are being utilized to support subterranean operations (e.g. drilling operations, completion operations, etc.). The historical information can be collected from various rig equipment or entered manually to the rig controller 90. Therefore, storage of the tubulars 54 in the fingerboard 40 can be organized based on prior and planned future utilization of the tubulars 54, as well as the parameters of the tubulars 54. The historical information of each tubular 54 can include positions in tubular strings 58 in which each tubular 54 have been utilized. The prior utilization can include the rotational speeds, rotational torques, tubular deflections (e.g. caused by angled wellbore portions), and duration of the prior utilization for each tubular 54. The historical information can also include environmental conditions during the prior utilization. The rig controller 90 can use the historical information for each tubular 54 to plan future utilization of the tubulars 54 and to plan storage of the tubulars 54 in the fingerboard 40. The rig controller 90 can also use the logged parameters, type, and historical information for each tubular 54 to automate a tally of tubulars 54 used in the subterranean operation. The location of each tubular 54 in the fingerboard can also be logged when each tubular 54 is stored in the fingerboard. With the logged information, the rig controller 90 can locate a specific tubular 54 or a specific type of tubular 54, if requested by an operator, another controller, or executable instructions of the rig controller 90.

Figure 3:
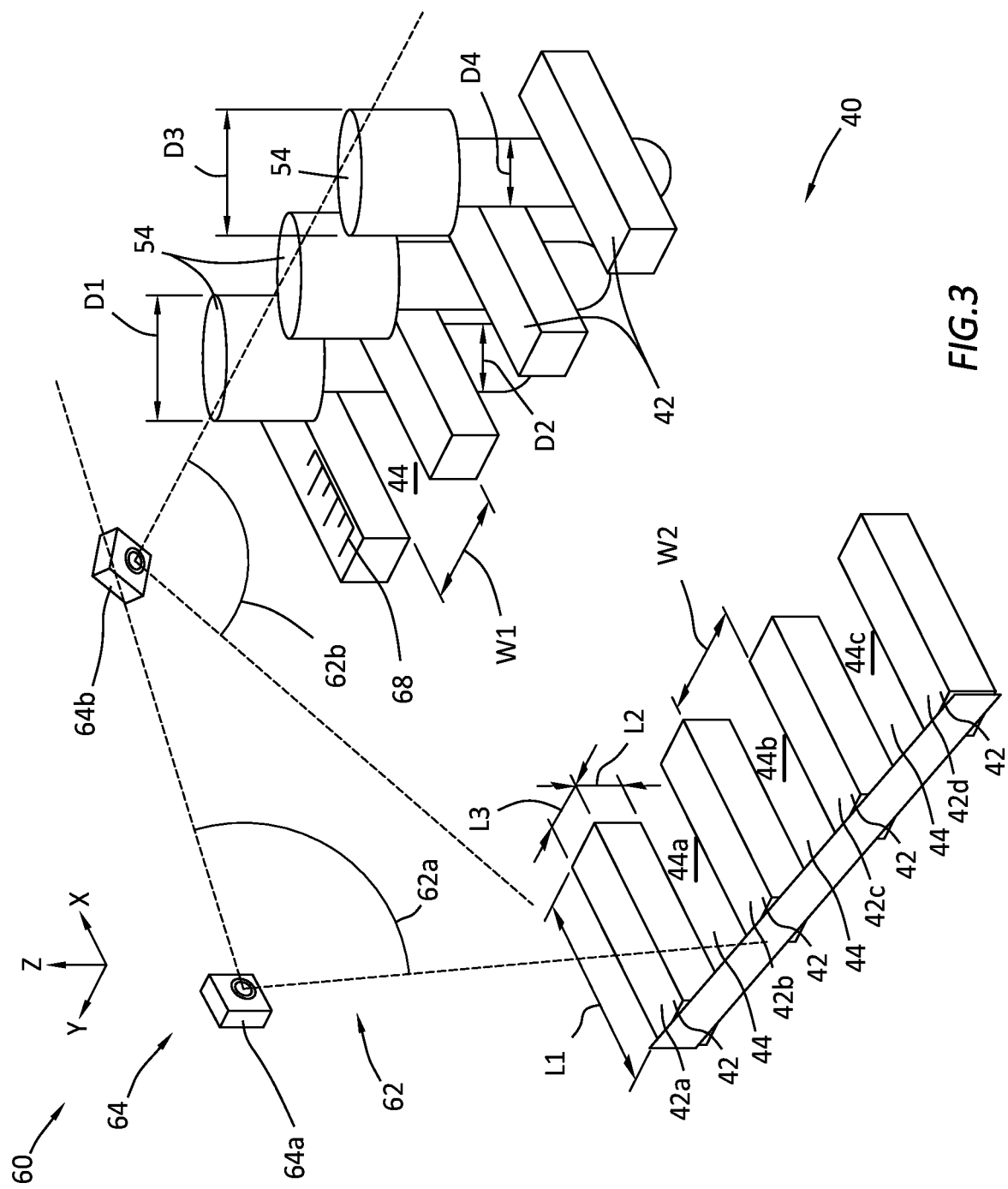
FIG. 3 is a representative perspective view of a fingerboard with tubulars stored therein, in accordance with certain embodiments.

FIG. 3 is a representative perspective view of a fingerboard 40 with tubulars 54 stored therein, in accordance with certain embodiments. Two image sensors 64*a*, 64*b* are shown with each having a different orientation and field of view 62*a*, 62*b* of the fingerboard 40. The orientation, field of view, and location on the rig 10 can be established by comparing images collected via the sensors 64*a*, 64*b* and correlating objects in the images that have known dimensions to the orientation and scaling of the objects in the collected images. By calculating the orientation and scaling of the objects in the collected images a perspective of each sensor 64*a*, 64*b* can be predicted, where the predicted perspective can include the orientation, field of view, and location on the rig 10 of each sensor. With the predicted perspective established, the images from the sensors 64*a*, 64*b* can be used to measure unknown dimensions of other objects on the rig 10. The orientation of each sensor 64*a*, 64*b* can be established in relation to X-Y-Z coordinate axes of the rig 10. The field of view 62*a*, 62*b* of the respective image sensor 64*a*, 64*b* can be established based on images collected by the respective image sensor 64*a*, 64*b*. The location of the respective image sensor 64*a*, 64*b* can be established based on images collected by the respective image sensor 64*a*, 64*b* by comparing the orientation and scaling of a known object in the collected images with the known size, shape, and orientation of the known object.

When the sensors 64*a*, 64*b* are installed, replaced, or adjusted for any reason on the rig 10, the perspective of the sensors 64*a*, 64*b* can be unknown. However, by using the vision system 60, the rig controller 90 can establish the predicted perspective of each sensor 64, thereby calibrating the image sensors 64 and allowing the rig controller 90 to determine dimensions of unknown objects in collected images from the sensor 64.

One way to establish the predicted perspective of each one of the sensors 64*a*, 64*b* is to import a 3D model of the rig 10 (or at least a portion of the rig 10) and "fit" the collected images from each of the sensors 64*a*, 64*b* to the 3D model. "Fitting" refers to manipulating the collected images that have captured a known object such that the known object in the captured images aligns with the known object in the 3D model for each of the sensors 64. The "known object" can be the same for each sensor 64 or different. The "known object(s)" are included in the 3D model. With the collected images from each of the sensors 64*a*, 64*b* fitted to the 3D model, the rig controller 90 can then determine the predicted perspective of each of the sensors 64 that would yield the collected images of the known object(s). For example, a 3D model of the rig 10 that includes the fingerboard 40 can be imported into the rig controller 90. With images collected from the sensor 64*a* and transmitted to the rig controller 90, the rig controller 90 can manipulate the collected images of the sensor 64*a* such that the known objects in the collected images align with the known objects in the 3D model. With the actual rig portion in the collected images aligned with the 3D model, the rig controller 90 can determine a predicted perspective of the sensor 64*a*, with the predicted perspective including a location, orientation, and field of view 62*a* of the sensor 64*a*. Once the collected images of the rig 10 are fitted (or aligned) with the 3D model, the predicted perspective can be established as the actual location of the sensor 64a. With the predicted perspective of the sensor 64a established (which emulates the actual perspective of the sensor 64a), the collected images can be analyzed to determine the dimensions of unknown objects, such as tubulars 54, in the sensor's field of view 62a. It should be understood, that the predicted perspective of each sensor 64 can also be established by manipulating the 3D model until known object(s) in a portion of the 3D model aligns with the known objects in the captured images.

The length L1, height L2, and width L3 of a finger 42 (e.g. finger 42a) of the fingerboard 40 and the widths W1, W2 of fingerboard slots 44 can be known dimensions provided by the 3D model. Collected images that include known objects of known size (e.g. fingerboard 40) can be used to determine the dimensions of objects in collected images of unknown size, such as the diameters D1, D2, D3, D4 of tubulars 54. Other dimensions, such as height of features of the tubulars 54 above the fingerboard and overall height of the tubulars 54 (since the height of the fingerboard from the rig floor 16 is known) can be determined from the collected images by the rig controller 90. The rig controller 90 can also determine the absence or presence of an enlarged diameter box end of the tubular 54, dimensions of the box end (if present), the absence or presence of a sub attached to an end of the tubular 54, and dimensions of the sub (if present).

It should be understood that the predicted perspective of the sensor 64a can be determined without importing a 3D model of the rig 10 into the rig controller 90. The predicted perspective (i.e., orientation related to the X-Y-Z axes of the rig 10, location on the rig 10, and field of view 62a of the sensor 64a) can be determined by capturing images of a visible marker 68 of known size and shape. The known size and shape of the visible marker 68 can be input into the rig controller 90 by an operator via a user input means (e.g., keyboard, mouse, voice command, touch screen, wireless interface, network connection, etc.). The collected images from the sensor 64a can include a perspective view of a visible marker 68 in a field of view 62a. Since the size, shape, and orientation (relative to the rig 10) of the visible marker 68 is known, then the rig controller 90 can adjust a predicted perspective of the sensor 64a to align the perspective of each sensor to the visible marker 68. The visible marker 68 can be a series of markings of known sizes and known relative orientations to each other, similar to markings on a ruler. The marker 68 can also be a 3D object of known size, shape, and orientation to the X-Y-Z axes of the rig 10. By fitting a predicted perspective of the sensor 64a to align with the visible marker 68 in the collected images, the rig controller 90 can establish the predicted perspective of the sensor 64a.

The predicted perspective can be determined by an iterative process of assuming a predicted perspective and comparing a calculated size, shape, and orientation of the known object to the actual size, shape, and orientation of the known object in the collected images. If the comparison indicates that the predicted perspective of the sensor 64a is not correct, then another predicted perspective can be used to compare a calculated size, shape, and orientation of the known object to the actual size, shape, and orientation of the known object in the capture images. When the calculated size, shape, and orientation of the known object compares to the actual size, shape, and orientation of the known object in the capture images, then the last predicted perspective can be established as the final predicted perspective of the sensor 64.

The predicted perspective can also be calculated by determining the size, shape, and orientation of the known object as seen in the collected images and using the size, shape, and orientation of the known object to extrapolate to a predicted perspective for the sensor 64a. Once the predicted perspective (including location, orientation, and field of view) is established for the sensor 64a, the rig controller 90 can calculate unknown dimensions of unknown objects (e.g. tubulars 54) in the collected images based on the known size, shape, and orientation of the known object from the predicted perspective.

The same procedures described above can be performed for each sensor 64 (e.g. 64a, 64b, 64c, 64d, . . . ) to establish the perspective and field of view of each sensor 64. Therefore, the rig controller 90 can determine parameters of each unknown object in the collected images based on the known parameters of known objects in collected images from the respective sensor 64.

Figure 4A:
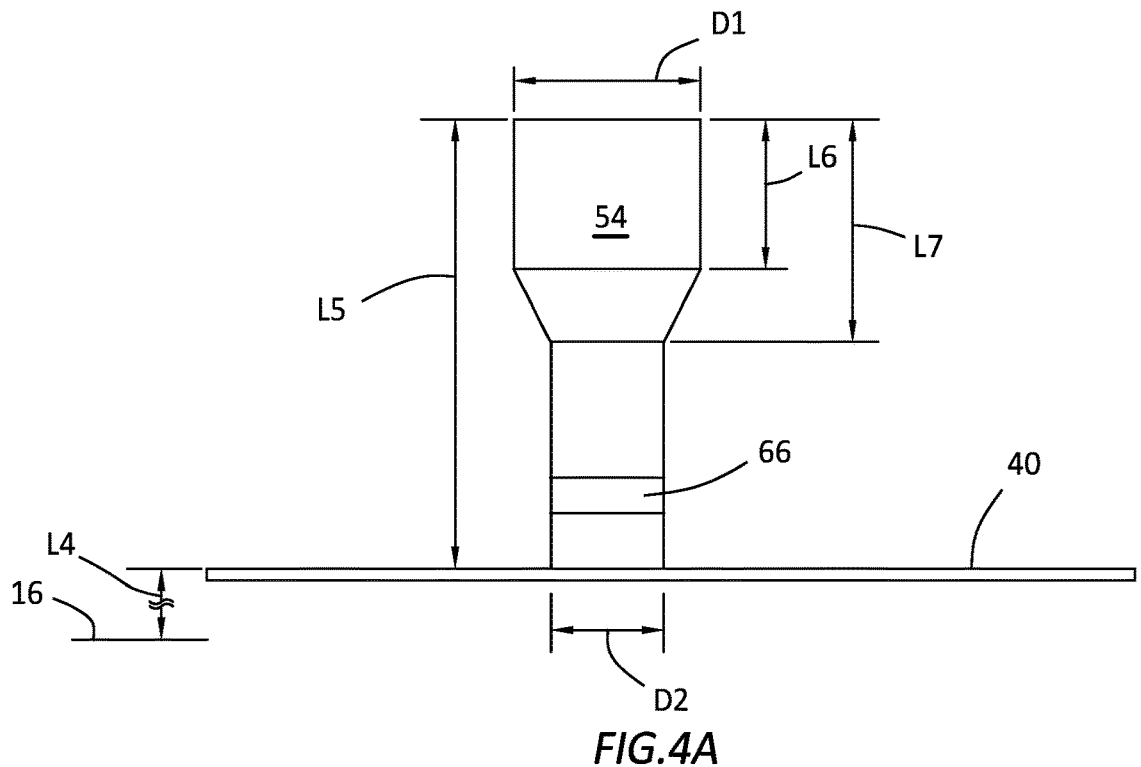
FIGS. 4A-4B are representative side views of various types of tubulars stored in a fingerboard, in accordance with certain embodiments.
Figure 4B:
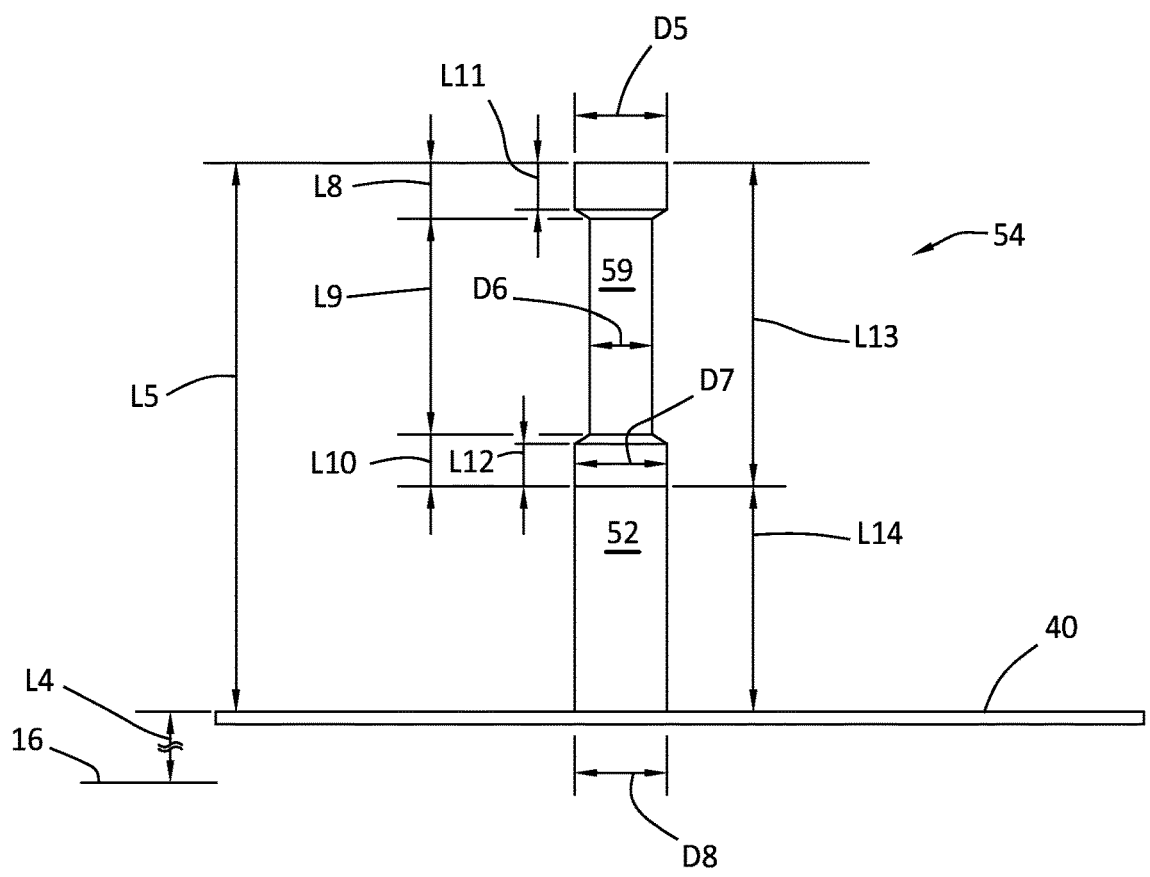

FIGS. 4A-4B are representative side views of various types of tubulars stored in a fingerboard, in accordance with certain embodiments. FIGS. 4A-4B show parameters that can be determined by the rig controller 90 using the vision system 60 once the predicted perspective of each sensor 64 has been established. By analyzing collected images from one or more of the sensors 64, the rig controller 90 can determine the height L5 that the tubular 54 extends above the fingerboard 40. With the length L4 from the rig floor 16 and the fingerboard 40 known, the overall height (L4+L5) of the tubular 54 can be determined.

The rig controller 90 can determine if the tubular has a box end or not. The rig controller 90 can determine the outer diameter D1 of the box end of the tubular 54, and the diameter D2 of the body of the tubular 54. The rig controller 90 can determine the length L6 of the box end having a substantially constant outer diameter D1 along the length L6. The rig controller 90 can determine the distance L7 from the top of the box end to the beginning of the body portion of the tubular 54 having an outer diameter D2. Visible markers 66 can be included in the collected images and can be used to communicate parameters of the tubular 54 to the rig controller 90, such as a unique identifier of the tubular 54, a unique identifier of a type of the tubular 54, a bar code, a Q-code, a color code, an engraved or punched feature (e.g. letters, numbers, symbols, etc.), a vendor, a manufactured date, a material used to build the tubular, or combinations thereof. The rig controller 90 can capture historical data from a database containing data related to the particular tubular 54. Alternatively, or in addition to, the rig controller 90 can capture the historical data for each tubular 54, by logging the information for each tubular 54 as it is utilized by the rig 10.

The rig controller 90 can determine if the tubular 54 has a sub 59 attached to an end of a tubular segment 52. If a sub 59 is detected, then the rig controller 90 can determine the length L13 of the sub 59, the height L14 of the top of the tubular segment 52 from the fingerboard 40, the overall height (L4+L5) of the tubular 54, lengths L11, L12 of box ends of the sub 59, distances L8, L10 of the body portion of the sub 59 to the ends of the sub 59, the lengths L11, L12 of the body portion of the sub 59, and the length L9 of the body portion of the sub 59. The rig controller 90 can determine the diameters D5, D7 of the respective box ends of the sub 59, the diameter D6 of the body portion of the sub 59, and the diameter D8 of the tubular segment 52.

Figure 5:
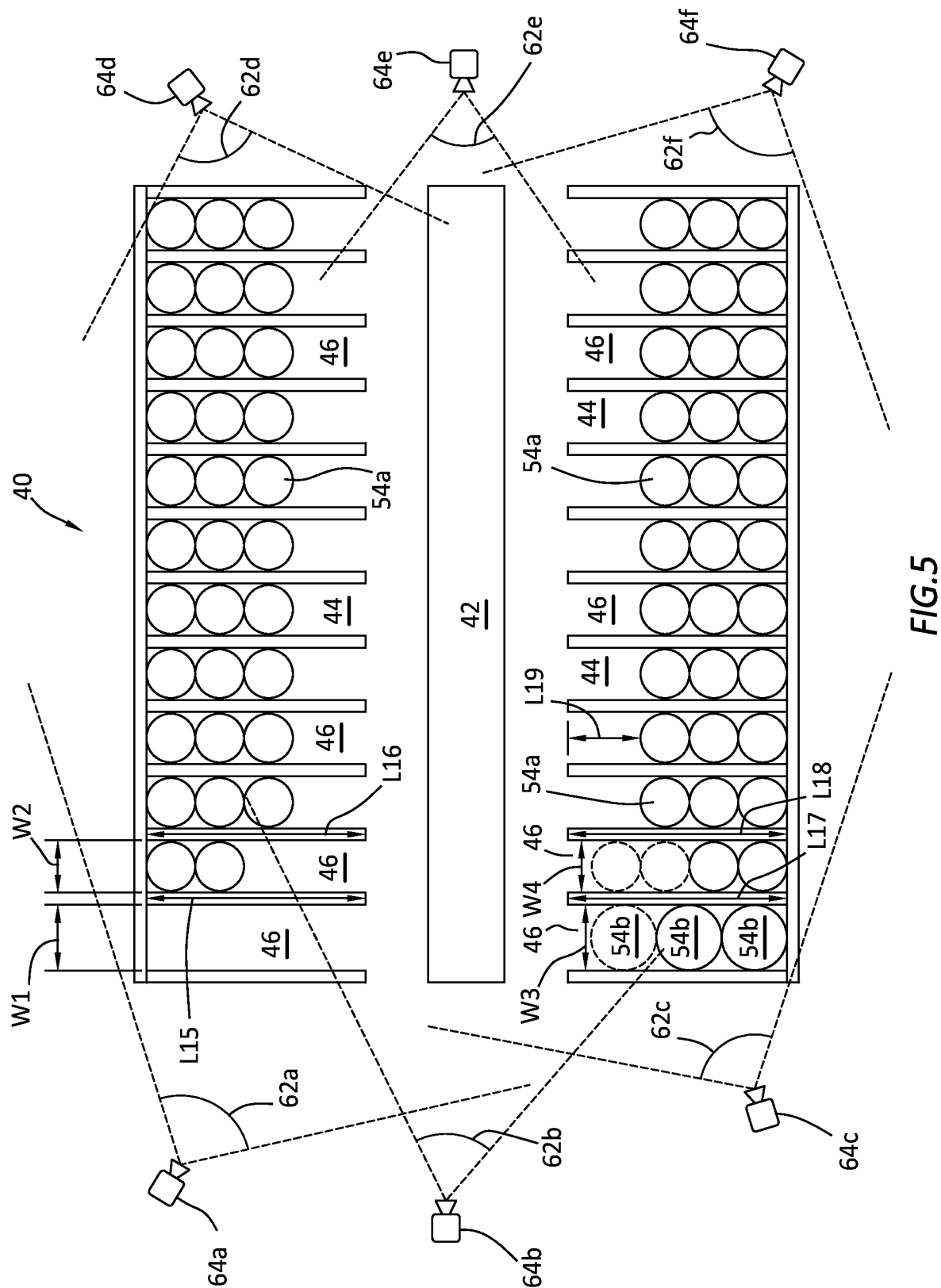
FIG. 5 is a representative top view of various types of tubulars stored in a fingerboard with imaging sensors viewing the fingerboard storage, in accordance with certain embodiments.

FIG. 5 is a representative top view of various types of tubulars 54a, 54b stored in a fingerboard 40 with imaging sensors 64 (e.g. 64a-f) viewing the fingerboard storage area, in accordance with certain embodiments. With the predicted perspective (including position, orientation, and field of view 62a-f) of each of the imaging sensors 64 being established, then these imaging sensors can collect images that can be used by the rig controller 90 to manage the storage of tubulars 54 in the fingerboard 40. The rig controller 90 can calculate the dimensions (width and length) of each of the fingerboard slots 44 and calculate the available storage area 46 of each of the slots 44, such as lengths L15, L16, L17, L18 and widths W1, W2, W3, W4. The rig controller 90 can determine the parameters and types of each of the tubulars 54 being installed, stored, and retrieved in the fingerboard 40. The rig controller 90 can determine the amount of space currently occupied by the stored tubulars 54 in each slot 44, and determine the amount of storage space currently available for storing additional tubulars 54.

The slots 44 with widths W1, W3 are indicated as being different widths than the slots 44 with widths W2, W4. Different width slots 44 can be used to store particular types of tubulars 54, where other slots can store other types of tubulars 54. For example, larger tubulars 54b (such as casing tubulars, drill collars, etc.) can be stored in the slots with widths W1 or W3. However, these larger tubulars 54b may not be compatible with available storage locations in the other slots 44, such as those with widths W2, W4. Conversely, the smaller tubulars 54a (such as drilling tubulars) may be compatible with storage space in the slots 44 with widths W2 or W4, but it may not be desirable to store these smaller tubulars 54a in the wider slots 44 with widths W1 or W3.

Therefore, the rig controller 90 can determine (based on images collected by the vision system 60) the types of each tubular 54, and which slots 44 to store the tubulars 54. The rig controller 90 can determine which slots 44 have available storage locations 46 (length L19 of empty space in each slot 44 with the corresponding width of each slot 44) for tubular 54 storage and then direct the tubulars 54 to be stored in available locations 46. However, the rig controller 90 can also store the tubulars 54 in the fingerboard 40 based on the available locations 46 and the historical data associated with each tubular 54. For example, as the tubulars 54 are utilized in the subterranean operations, some tubulars 54 will be utilized more while others may be utilized less. The rig controller 90 can arrange the fingerboard 40 storage of the tubulars 54 to utilize under-utilized tubulars 54 more and utilize over-utilized tubulars 54 less. This allows the rig controller 90 to actively level the utilization across the tubulars 54. Additionally, if the historical data indicates that some tubulars have been utilized in higher stress conditions (e.g. high torque, high torque in deviated portion of wellbore 15, accelerated wear based on simulation data, visible wear, etc.), then the rig controller 90 can manage the tubular 54 storage to maximize a life expectancy of each tubular 54 and possibly minimize rig 10 downtime associated with failures of tubulars 54 in the tubular string 58.

After the available storage space 46 in each slot 44 has been established, it may not be necessary for the rig controller 90 to continue calculations based on the collected images to determine available storage in the fingerboard 40. The rig controller 90 can keep track of the types of tubulars 54 that have been stored in or retrieved from the fingerboard 40 and keep a running tally to keep track of available storage locations 46 of the tubulars 54. The rig controller 90 can still use the vision system 60 to verify number of tubulars 54 in each slot without having to calculate the distances and available space based on the collected images. It can be seen that any number of imaging sensors 64 (e.g. 64a-64f) can be used to provide visual coverage of the fingerboard 40 storage.

Figure 6:
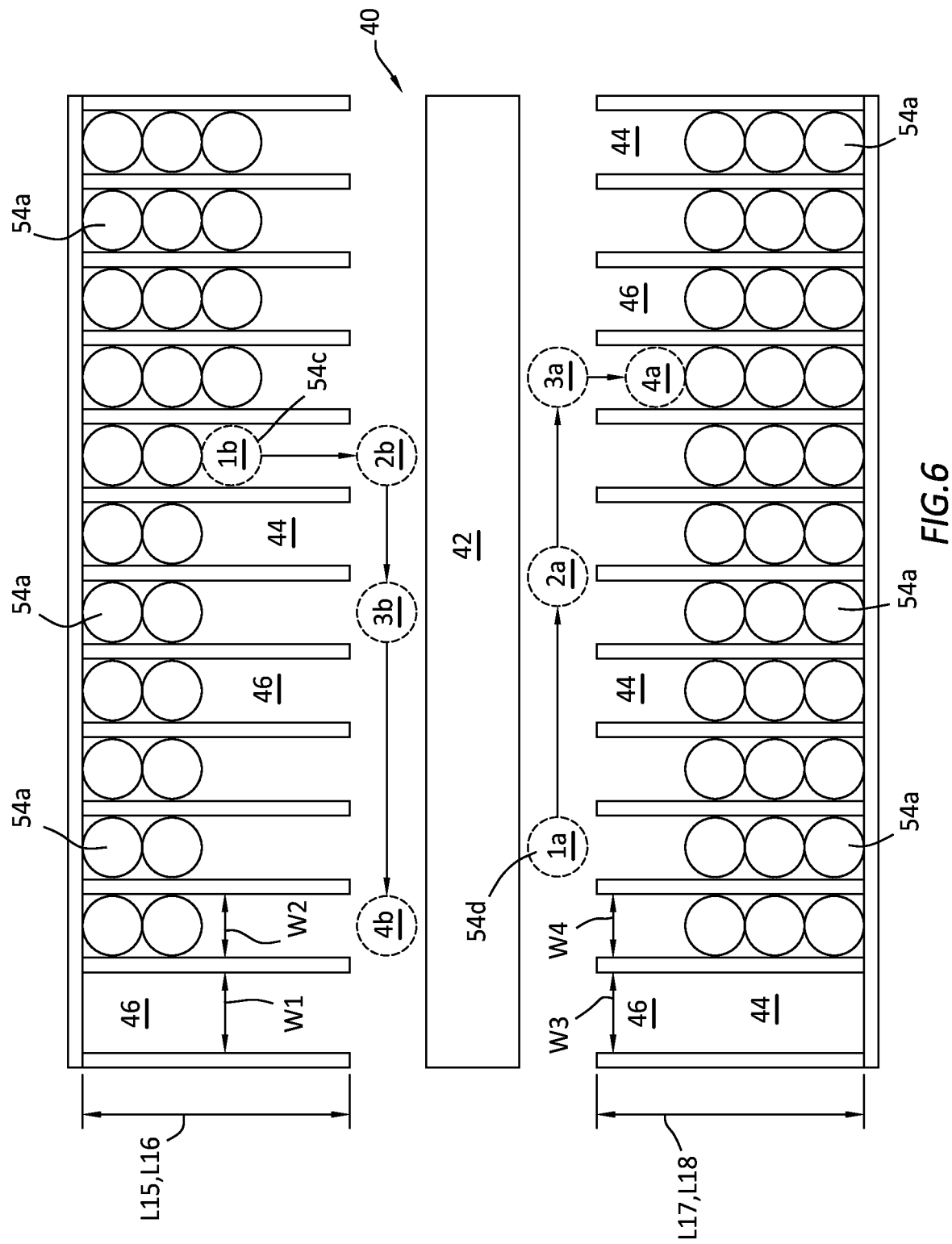
FIG. 6 is a representative top view of tubulars stored in or retrieved from a fingerboard, in accordance with certain embodiments.

FIG. 6 is a representative top view of the fingerboard 40 showing tubulars 54 stored in or retrieved from the fingerboard 40, in accordance with certain embodiments. As a tubular 54d is being transferred from another location on the rig 10 to the fingerboard 40, the vision system 60 can collect images of the tubular 54d which the rig controller 90 can use to calculate its type and determine a desired storage location 46 in the fingerboard 40 for the tubular 54d. The rig controller 90 can then direct the pipe handler 30 or rig operators to move the tubular 54d into the desired storage location 46. A position 1a of the tubular 54d is shown in the bottom half of the fingerboard (bottom being relative to the figure) where the pipe handler or operator has directed the tubular 54d. The tubular 54d can then be moved to locations 2a then 3a until being stored in the desired location 46 at location 4a. When the tubular 54d is stored at location 4a, then the rig controller 90 can determine any remaining parameters that have not yet been determined (or verified), such as overall height of the tubular 54d, height from the fingerboard 40, etc.

When a tubular 54c is selected for removal from the fingerboard 40 (e.g. for utilization in the subterranean operation), the rig controller 90 can then direct the pipe handler 30 or rig operators to move the tubular 54c from the identified storage location 1b out of the fingerboard 40. The tubular 54c can be moved from the location 1b to the location 2b, then to location 3b, then to location 4b and then out of the fingerboard 40. The rig controller 90 can use images from the vision system 60 to verify the type of the tubular 54c (box end, no box end, sub, no sub, etc.) and verify its height dimensions prior to leaving the fingerboard 40. If any of these parameters do not match the desired parameters, then the rig controller 90 can indicate to an operator that there may be a problem with the selected tubular 54c.

Figure 7:
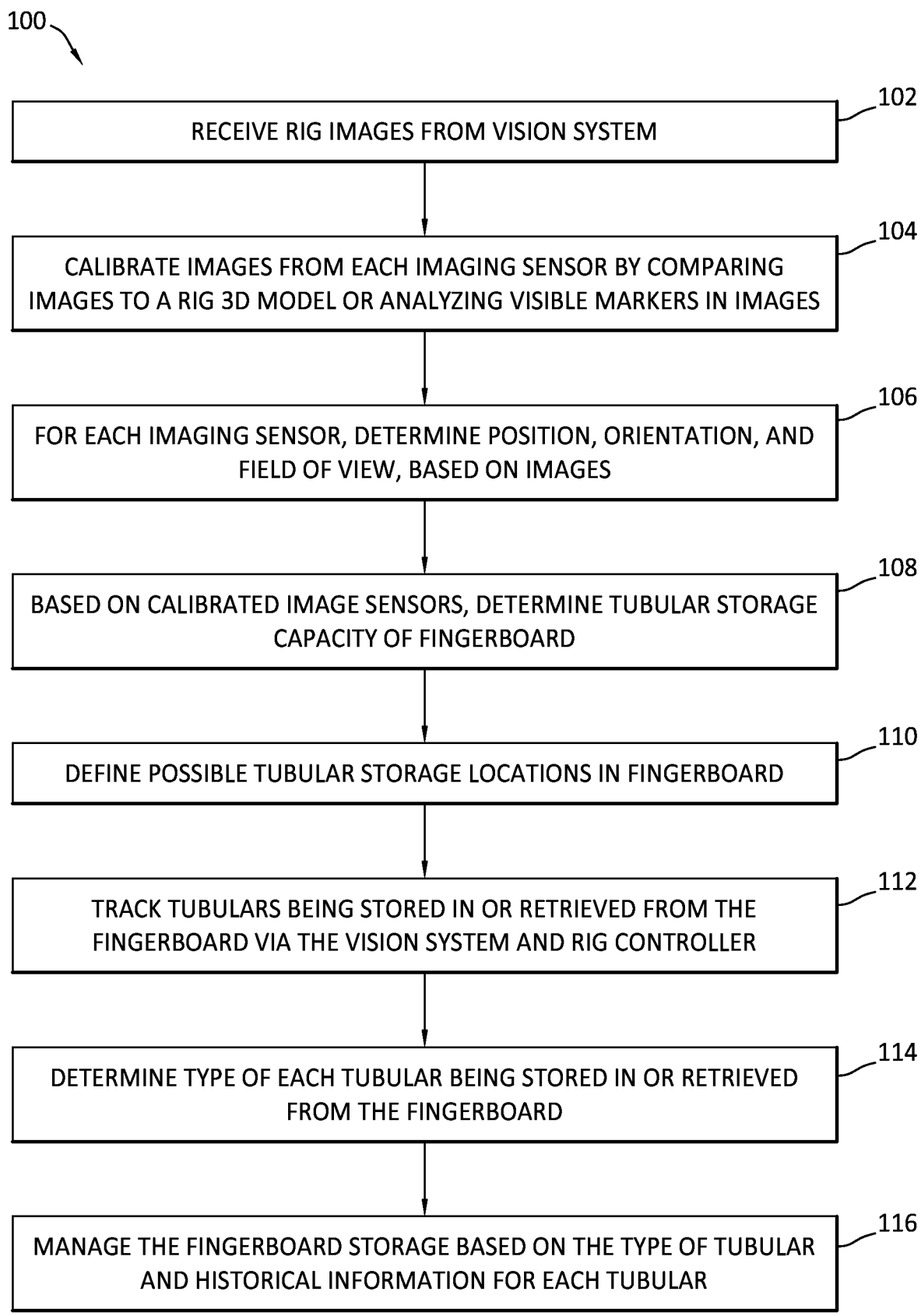
FIG. 7 is a representative block diagram of a method of managing tubular storage in a fingerboard on a rig, in accordance with certain embodiments.

FIG. 7 is a representative block diagram of a method 100 of managing tubular 54 storage in a fingerboard 40 on a rig 10, in accordance with certain embodiments. As described above, the rig 10 can include a vision system 60 with sensors 64 that can collect images of portions of the rig 10 and transmit those collected images to a rig controller 90. The rig controller 90 can be configured to perform the method 100. In operation 102, the rig controller 90 can receive images collected by the sensors 64 of the vision system 60. In operation 104, the rig controller 90 can calibrate the collected images for each of the imaging sensors 64 of the vision system 60 by comparing the collected images to a 3D model imported into the rig controller 90, or by analyzing visible markers in the collected images. In operation 106, the rig controller 90 can calculate a predicted perspective (including location, orientation, and field of view) for each of the imaging sensors 64 based on the collected images. In operation 108, the rig controller 90 can determine a tubular 54 storage capacity of the fingerboard 40 based on the calibrated imaging sensors 64 (i.e. the predicted perspective of each imaging sensor 64). In operation 110, the rig controller 90 can also calculate available storage locations in the fingerboard 40 for tubulars 54. In operation 112, the rig controller 90, via the vision system, can track the tubulars 54 being stored in or retrieved from the fingerboard 40. In operation 114, the rig controller 90 can use images from the calibrated imaging sensors 64 to determine parameters of the tubulars 54 and a type of each of the tubulars 54 being stored in or retrieved from the fingerboard 40. In operation 116, the rig controller 90 in coordination with the vision system 60 can manage storage of the tubulars 54 in the fingerboard 40 based on type of each tubular 54, as well as historical information logged for each tubular 54.

EMBODIMENTS

Embodiment 1. A method of managing tubular storage in a fingerboard on a rig, the method comprising:
  determining, via a rig controller, a selection of a location in the fingerboard for one or more tubulars and placement of the one or more tubulars in the fingerboard based on available locations in the fingerboard and historical information of each of the one or more tubulars.

Embodiment 2. The method of embodiment 1, wherein the historical information for each one of the one or more tubulars comprises:
  one or more positions in one or more tubular strings in which each one of the one or more tubulars have been utilized;
  duration of a prior utilization of each one of the one or more tubulars in the one or more tubular strings;
  torque applied to the one or more tubular strings during the prior utilization;
  weight on bit during the prior utilization;
  environmental conditions during the prior utilization; or
  combinations thereof.

Embodiment 3. The method of embodiment 1, further comprising: collecting, via sensors of a vision system, images of at least a portion of the fingerboard; and identifying each one of the one or more tubulars being stored in or retrieved from the fingerboard based on the images.

Embodiment 4. The method of embodiment 3, further comprising: logging a storage location for each of the one or more tubulars being stored in the fingerboard or retrieved from the fingerboard.

Embodiment 5. The method of embodiment 4, further comprising:
  storing, via a pipe handler, the one or more tubulars at a respective storage location in the fingerboard; or
  retrieving, via the pipe handler, the one or more tubulars from a respective storage location in the fingerboard, wherein the pipe handler is a manually operated pipe handler or an automated pipe handler.

Embodiment 6. The method of embodiment 2, further comprising:
  collecting, via sensors of a vision system, one or more first images of at least a portion of the rig;
  comparing the first images, via the rig controller, to a reference, wherein the reference is a 3D model, a visible distance indicator, or a combination thereof;
  calibrating the vision system by determining, via the rig controller, a position, an orientation, a field of view, or combinations thereof for each of the sensors based on the comparing;
  collecting, via the sensors, one or more second images of at least a portion of the rig, with the second images comprising images of the fingerboard; and
  determining, via the rig controller, an available total tubular storage space of the fingerboard based on the images of the fingerboard and the calibrated vision system.

Embodiment 7. The method of embodiment 6, further comprising:
  determining, via the rig controller, a width and a length of each one of multiple slots of the fingerboard based on the images of the fingerboard and the calibrated vision system; and
  determining, via the rig controller, a slot tubular storage space of each one of the multiple slots based on the width and the length of each one of the multiple slots.

Embodiment 8. The method of embodiment 7, further comprising:
  collecting, via the sensors, one or more third images of at least a portion of the rig, with the third images comprising images of a first tubular;
  calculating, via the rig controller, parameters of the first tubular based on the third images and the calibrated vision system; and
  determining a type of the first tubular based on the parameters of the first tubular.

Embodiment 9. The method of embodiment 8, wherein the parameters of the first tubular comprise:
  a presence or absence of a box;
  a length of the box, when the box is present;
  a diameter of the box, when the box is present;
  a diameter of a body portion;
  a presence or absence of a sub attached at an end of the first tubular;
  a length of the sub, when the sub is present;
  a diameter of each end of the sub, when the sub is present;
  a diameter of a body of the sub, when the sub is present;
  a height, including the sub, above the fingerboard when the sub is present;
  the height of the first tubular, without the sub, above the fingerboard when the sub is absent;
  an overall length;
  cleanliness;
  visible markings; or
  combinations thereof.

Embodiment 10. The method of embodiment 8, further comprising:
  determining, via the rig controller, which one of multiple slots of the fingerboard to store the first tubular based on the type of the first tubular;
  storing the first tubular in the one of the multiple slots; and
  determining, via the rig controller, a remaining portion of the total tubular storage space available to store additional tubulars when the first tubular is stored in the one of the multiple slots.

Embodiment 11. The method of embodiment 6, further comprising:
  receiving multiple tubulars into the fingerboard;
  collecting, via the sensors, one or more fourth images of each one of the multiple tubulars;
  calculating, via the rig controller, parameters of each one of the multiple tubulars based on the fourth images and the calibrated vision system;
  determining a type of each one of the multiple tubulars based on the parameters of each one of the multiple tubulars; and
  logging the parameters and the type of each one of the multiple tubulars.

Embodiment 12. The method of embodiment 11, further comprising:
  determining, via the rig controller, a respective storage location in the fingerboard for each one of the multiple tubulars based on the type of each one of the multiple tubulars;
  storing each one of the multiple tubulars in the respective storage location; and logging, via the rig controller, the respective storage location for each one of the multiple tubulars; and determining, via the rig controller, a remaining portion of the total tubular storage space of the fingerboard when the multiple tubulars are stored in the fingerboard.

Embodiment 13. The method of embodiment 12, further comprising:
logging historical information for each one of the multiple tubulars; and
planning, via the rig controller, future utilization of the multiple tubulars based on the historical information of each one of the multiple tubulars.

Embodiment 14. A method of managing tubular storage in a fingerboard, the method comprising:
importing a 3D model of a rig into a rig controller;
collecting, via sensors of a vision system, one or more first images of at least a portion of the rig;
comparing the first images, via the rig controller, to the 3D model;
calibrating the vision system by determining, via the rig controller, a position, an orientation, a field of view, or combinations thereof for each of the sensors based on the comparing;
collecting, via the sensors, one or more second images of at least a portion of the rig, with the second images comprising images of the fingerboard; and
determining, via the rig controller, an available total tubular storage space of the fingerboard based on the images of the fingerboard and the calibrated vision system.

Embodiment 15. The method of embodiment 14, further comprising:
determining, via the rig controller, a width and a length of each one of multiple slots of the fingerboard based on the images of the fingerboard and the calibrated vision system; and
determining, via the rig controller, a slot tubular storage space of each one of the multiple slots based on the width and the length of each one of the multiple slots.

Embodiment 16. The method of embodiment 15, further comprising:
collecting, via the sensors, one or more third images of at least a portion of the rig, with the third images comprising images of a first tubular;
calculating, via the rig controller, parameters of the first tubular based on the third images and the calibrated vision system; and
determining a type of the first tubular based on the parameters of the first tubular.

Embodiment 17. The method of embodiment 16, wherein the parameters of the first tubular comprise:
a presence or absence of a box;
a length of the box, when the box is present;
a diameter of the box, when the box is present;
a diameter of a body portion;
a presence or absence of a sub attached at an end of the first tubular;
a length of the sub, when the sub is present;
a diameter of each end of the sub, when the sub is present;
a diameter of a body of the sub, when the sub is present;
a height, including the sub, above the fingerboard when the sub is present;
the height of the first tubular, without the sub, above the fingerboard when the sub is absent;
an overall length;
cleanliness;
visible markings; or
combinations thereof.

Embodiment 18. The method of embodiment 16, wherein the first tubular is a pipe stand that includes multiple tubulars coupled together to form the pipe stand.

Embodiment 19. The method of embodiment 16, further comprising:
determining, via the rig controller, which one of multiple slots of the fingerboard to store the first tubular based on the type of the first tubular;
storing the first tubular in the one of the multiple slots; and
determining, via the rig controller, a remaining portion of the total tubular storage space available to store additional tubulars when the first tubular is stored in the one of the multiple slots.

Embodiment 20. The method of embodiment 14, further comprising:
receiving multiple tubulars into the fingerboard;
collecting, via the sensors, one or more fourth images of each one of the multiple tubulars;
calculating, via the rig controller, parameters of each one of the multiple tubulars based on the fourth images and the calibrated vision system;
determining a type of each one of the multiple tubulars based on the parameters of each one of the multiple tubulars; and
logging the parameters and the type of each one of the multiple tubulars.

Embodiment 21. The method of embodiment 20, further comprising:
determining, via the rig controller, a respective storage location in the fingerboard for each one of the multiple tubulars based on the type of each one of the multiple tubulars;
storing each one of the multiple tubulars in the respective storage location; and
logging, via the rig controller, the respective storage location for each one of the multiple tubulars; and
determining, via the rig controller, a remaining portion of the total tubular storage space of the fingerboard when the multiple tubulars are stored in the fingerboard.

Embodiment 22. The method of embodiment 21, further comprising:
logging historical information for each one of the multiple tubulars; and
planning, via the rig controller, future utilization of the multiple tubulars based on the historical information of each one of the multiple tubulars.

Embodiment 23. The method of embodiment 22, wherein the historical information for each one of the multiple tubulars comprises:
one or more positions in one or more tubular strings in which each one of the multiple tubulars have been utilized prior to the planning;
duration of prior utilization of each one of the multiple tubulars in the one or more tubular strings;
torque applied to the one or more tubular strings during the prior utilization;
weight on bit during the prior utilization;
environmental conditions during the prior utilization; or combinations thereof.

Embodiment 24. The method of embodiment 22, wherein the future utilization planning of the multiple tubulars increases a utilization of under-utilized ones of the multiple tubulars and decreases utilization of over-utilized ones of the multiple tubulars.

Embodiment 25. The method of embodiment 24, further comprising:
retrieving one or more of the multiple tubulars from the fingerboard based on the future utilization planning; and
logging additional historical information for each one of the retrieved ones of the multiple tubulars.

Embodiment 26. The method of embodiment 24, further comprising:
determining, via the rig controller, the remaining portion of the total tubular storage space of the fingerboard when the one or more of the multiple tubulars are retrieved from the fingerboard.

Embodiment 27. The method of embodiment 21, further comprising:
retrieving a specific tubular or a specific type of tubular from the multiple tubulars in the fingerboard based on a selection from a user interface, the rig controller, or both.

Embodiment 28. The method of embodiment 20, further comprising:
determining, via the rig controller, a respective storage location in the fingerboard for each one of the multiple tubulars based on:
the type of each one of the multiple tubulars,
a fingerboard layout for optimizing storage of the multiple tubulars,
historical information for each one of the multiple tubulars, or
combinations thereof;
storing each one of the multiple tubulars in the respective storage location; and
logging, via the rig controller, the respective storage location for each one of the multiple tubulars; and
determining, via the rig controller, a remaining portion of the total tubular storage space of the fingerboard when the multiple tubulars are stored in the fingerboard.

Embodiment 29. The method of embodiment 28, further comprising:
logging historical information for each one of the multiple tubulars; and
planning, via the rig controller, future utilization of the multiple tubulars based on the historical information of each one of the multiple tubulars.

Embodiment 30. The method of embodiment 29, wherein the historical information for each one of the multiple tubulars comprises:
one or more positions in one or more tubular strings in which each one of the multiple tubulars have been utilized prior to the planning;
duration of prior utilization of each one of the multiple tubulars in the one or more tubular strings;
torque applied to the one or more tubular strings during the prior utilization;
weight on bit during the prior utilization;
environmental conditions during the prior utilization; or
combinations thereof.

Embodiment 31. A method of handling tubulars on a rig having a fingerboard for tubular storage, the method comprising:
importing a 3D model of the rig into a rig controller;
collecting, via sensors of a vision system, one or more first images of at least a portion of the rig;
comparing the first images, via the rig controller, to the 3D model;
calibrating the vision system by determining, via the rig controller, a position, an orientation, a field of view, or combinations thereof for each of the sensors based on the comparing;
collecting, via the sensors, one or more second images of at least a portion of the rig, with the second images comprising images of a first tubular;
calculating, via the rig controller, parameters of the first tubular based on the second images and the calibrated vision system;
determining a type of the first tubular based on the parameters of the first tubular;
determining a storage location in the fingerboard for the first tubular based on the type of the first tubular; and
storing the first tubular in the storage location.

Embodiment 32. The method of embodiment 31, wherein the parameters of the first tubular comprise:
a presence or absence of a box;
a length of the box, when the box is present;
a diameter of the box, when the box is present;
a diameter of a body portion;
a presence or absence of a sub attached at an end of the first tubular;
a length of the sub, when the sub is present;
a diameter of each end of the sub, when the sub is present;
a diameter of a body of the sub, when the sub is present;
a height, including the sub, above the fingerboard when the sub is present;
the height of the first tubular, without the sub, above the fingerboard when the sub is absent;
an overall length;
cleanliness;
visible markings; or
combinations thereof.

Embodiment 33. The method of embodiment 32, further comprising:
adjusting, via the rig controller, a height of a top drive based on the parameters of the first tubular;
retrieving, via a pipe handler, the first tubular from the fingerboard;
presenting, via the pipe handler, the first tubular to the top drive;
coupling the first tubular to a tubular string; and
extending the tubular string into a wellbore.

Embodiment 34. The method of embodiment 33, further comprising:
logging, via the rig controller, historical information of the first tubular while the first tubular is coupled to the tubular string;
tripping the tubular string from the wellbore;
retrieving, via the pipe handler, the first tubular from the top drive, wherein the pipe handler is a manually operated pipe handler or an automated pipe handler; and
storing the first tubular in the fingerboard based on the historical information when compared to historical information of other tubulars stored in the fingerboard.

Embodiment 35. The method of embodiment 31, further comprising:
collecting, via the sensors, one or more third images of at least a portion of the rig, with the third images comprising images of the fingerboard; and
determining, via the rig controller, an available total tubular storage space of the fingerboard based on the images of the fingerboard and the calibrated vision system.

Embodiment 36. A system for managing tubular storage in a fingerboard during a subterranean operation, the system comprising:
a rig;
the fingerboard configured to store one or more tubulars in one or more slots of the fingerboard during the subterranean operation;
a vision system with one or more sensors that collect images of at least a portion of the rig; and
a rig controller comprising one or more processors, and one or more non-transitory, computer-readable media having executable instructions stored thereon, the executable instructions comprising instructions that:
instruct the vision system to collect one or more first images of at least a portion of the rig;
instruct the one or more processors to perform a comparison of the first images to a 3D model of the rig;
instruct the one or more processors to calibrate the vision system by determining a position, an orientation, a field of view, or combinations thereof for each of the sensors based on the comparison;
instruct the vision system to collect one or more second images of at least a portion of the rig, with the second images comprising images of the fingerboard; and
instruct the one or more processors to determine an available total tubular storage space of the fingerboard based on the images of the fingerboard and the calibrated vision system.

Embodiment 37. The system of embodiment 36, wherein the executable instructions further comprise instructions that:
instruct the one or more processors to determine a width and a length of each one of the slots of the fingerboard based on the images of the fingerboard and the calibrated vision system; and
instruct the one or more processors to determine a slot tubular storage space of each one of the slots based on the width and the length of each one of the slots.

Embodiment 38. The system of embodiment 37, wherein the executable instructions further comprise instructions that:
instruct the vision system to collect one or more third images of at least a portion of the rig, with the third images comprising images of a first tubular;
instruct the one or more processors to calculate parameters of the first tubular based on the third images and the calibrated vision system; and
instruct the one or more processors to determine a type of the first tubular based on the parameters of the first tubular.

Embodiment 39. The system of embodiment 40, wherein the parameters of the first tubular comprise:
a presence or absence of a box;
a length of the box, when the box is present;
a diameter of the box, when the box is present;
a diameter of a body portion;
a presence or absence of a sub attached at an end of the first tubular;
a length of the sub, when the sub is present;
a diameter of each end of the sub, when the sub is present;
a diameter of a body of the sub, when the sub is present;
a height, including the sub, above the fingerboard when the sub is present;
the height of the first tubular, without the sub, above the fingerboard when the sub is absent;
an overall length;
cleanliness;
visible markings; or
combinations thereof.

Embodiment 40. The system of embodiment 38, wherein the executable instructions further comprise instructions that:
instruct the one or more processors to determine which one of the slots of the fingerboard to store the first tubular based on the type of the first tubular;
instruct the one or more processors to store the first tubular in the one of the slots; and
instruct the one or more processors to determine a remaining portion of the total tubular storage space available to store additional tubulars when the first tubular is stored in the one of the slots.

Embodiment 41. The system of embodiment 40, further comprising:
a top drive;
a mousehole;
a catwalk; and
a pipe handler configured to at least transport the first tubular between the fingerboard and any one of the top drive, the mousehole, and the catwalk.

Embodiment 42. The system of embodiment 41, wherein the executable instructions further comprise instructions that:
instruct the pipe handler to retrieve the first tubular from the fingerboard;
instruct the pipe handler to transport the first tubular to the top drive; and
instruct the top drive to couple the first tubular to a tubular string and extend the tubular string into a wellbore.

Embodiment 43. The system of embodiment 42, wherein the executable instructions further comprise instructions that:
instruct the one or more processors to log historical information of the first tubular in the one or more non-transitory, computer-readable media while the first tubular is coupled to the tubular string;
instruct the pipe handler to transport the first tubular from the top drive when the tubular string is tripped from the wellbore; and
instruct the pipe handler to store the first tubular in the fingerboard based on the historical information when compared to historical information of other tubulars stored in the fingerboard. Furthermore, the illustrative methods described herein may be implemented by a system comprising a rig controller 90 that can include a non-transitory computer readable medium comprising instructions which, when executed by at least one processor of the rig controller 90, causes the processor to perform any of the methods described herein.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A method of managing tubular storage in a fingerboard on a rig, the method comprising:
determining, via a rig controller, a location in the fingerboard for ach one of one or more tubulars and placement of the one or more tubulars in the fingerboard based on available locations in the fingerboard and historical information of each of the one or more tubulars, wherein in the historical information comprises an amount of time each one of the one or more tub lars have been utilized in a tubular string;

storing, via a pipe handler, the one or more tubulars in respective storage locations in the fingerboard;

retrieving, via the pipe handler, the one or more tubulars from the respective storage locations in the fingerboard in a sequence that is based on the amount of time each of the one or more tubulars have been utilized, with a first tubular of the one or more tubulars having been utilized less than a second tubular of the one or more tubulars; and retrieving the first tubular from the fingerboard before retrieving the second tubular from the fingerboard due to a difference in the amount of time the first tubular and the second tubular have been utilized.

2. The method of claim 1, wherein the historical information for each one of the one or more tubulars further comprises:

one or more positions in one or more tubular strings in which each one of the one or more tubulars have been utilized;

torque applied to the one or more tubular strings during a prior utilization;

weight on bit during a prior utilization;

environmental conditions during a prior utilization; or combinations thereof.

3. The method of claim 1, further comprising:

collecting, via cameras of a vision system, images of at least a portion of the fingerboard;

identifying each one of the one or more tubulars being stored in or retrieved from the fingerboard based on the images; and logging a storage location for each of the one or more tubulars being stored in the fingerboard or retrieved from the fingerboard.

4. The method of claim 3, wherein the pipe handler is a manually operated pipe handler or an automated pipe handler.

5. The method of claim 2, further comprising:

collecting, via cameras of a vision system, one or more first images of at least a portion of the rig;

comparing the first images, via the rig controller, to a reference, wherein the reference is a 3D model, a visible distance indicator, or a combination thereof;

calibrating the vision system by determining, via the rig controller, a position, an orientation, a field of view, or combinations thereof for each of the cameras based on the comparing;

collecting, via the cameras, one or more second images of at least a portion of the rig, with the second images comprising images of the fingerboard; and determining, via the rig controller, an available total tubular storage space of the fingerboard based on the images of the fingerboard and the calibrated vision system.

6. The method of claim 5, further comprising:

determining, via the rig controller, a width and a length of each one of multiple slots of the fingerboard based on the images of the fingerboard and the calibrated vision system; and determining, via the rig controller, a slot tubular storage space of each one of the multiple slots based on the width and the length of each one of the multiple slots.

7. The method of claim 6, further comprising:

collecting, via the cameras, one or more third images of at least a portion of the rig, with the third images comprising images of a first tubular;

calculating, via the rig controller, parameters of the first tubular based on the third images and the calibrated vision system; and determining a type of the first tubular based on the parameters of the first tubular.

8. The method of claim 7, wherein the parameters of the first tubular comprise:

a presence or absence of a box;

a length of the box, when the box is present;

a diameter of the box, when the box is present;

a diameter of a body portion;

a presence or absence of a sub attached at an end of the first tubular;

a length of the sub, when the sub is present;

a diameter of each end of the sub, when the sub is present;

a diameter of a body of the sub, when the sub is present;

a height, including the sub, above the fingerboard when the sub is present;

the height of the first tubular, without the sub, above the fingerboard when the sub is absent;

an overall length;

cleanliness;

visible markings; or combinations thereof.

9. The method of claim 7, further comprising:

determining, via the rig controller, which one of the multiple slots of the fingerboard to store the first tubular based on the type of the first tubular;

storing the first tubular in the one of the multiple slots; and determining, via the rig controller, a remaining portion of the total tubular storage space available to store additional tubulars when the first tubular is stored in the one of the multiple slots.

10. The method of claim 5, further comprising:

receiving multiple tubulars into the fingerboard;

collecting, via the cameras, one or more fourth images of each one of the multiple tubulars;

calculating, via the rig controller, parameters of each one of the multiple tubulars based on the fourth images and the calibrated vision system;

determining a type of each one of the multiple tubulars based on the parameters of each one of the multiple tubulars; and logging the parameters and the type of each one of the multiple tubulars.

11. The method of claim 10, further comprising:

determining, via the rig controller, a respective storage location in the fingerboard for each one of the multiple tubulars based on the type of each one of the multiple tubulars;

storing each one of the multiple tubulars in the respective storage location; and logging, via the rig controller, the respective storage location for each one of the multiple tubulars; and determining, via the rig controller, a remaining portion of the total tubular storage space of the fingerboard when the multiple tubulars are stored in the fingerboard.

12. The method of claim 11, further comprising:

logging historical information for each one of the multiple tubulars; and planning, via the rig controller, future utilization of the multiple tubulars based on the historical information of each one of the multiple tubulars.

13. The method of claim 1, further comprising:
importing a 3D model of a rig into a rig controller;
collecting, via cameras of a vision system, one or more first images of at least a portion of the rig;
comparing the first images, via the rig controller, to the 3D model;
calibrating the vision system by determining, via the rig controller, a position, an orientation, a field of view, or combinations thereof for each of the cameras based on the comparing;
collecting, via the cameras, one or more second images of at least a portion of the rig, with the second images comprising images of the fingerboard; and
determining, via the rig controller, an available total tubular storage space of the fingerboard based on the images of the fingerboard and the calibrated vision system.

14. The method of claim 13, further comprising:
determining, via the rig controller, a width and a length of each one of multiple slots of the fingerboard based on the images of the fingerboard and the calibrated vision system; and
determining, via the rig controller, a slot tubular storage space of each one of the multiple slots based on the width and the length of each one of the multiple slots.

15. The method of claim 14, further comprising:
collecting, via the cameras, one or more third images of at least a portion of the rig, with the third images comprising images of a first tubular;
calculating, via the rig controller, parameters of the first tubular based on the third images and the calibrated vision system; and
determining a type of the first tubular based on the parameters of the first tubular.

16. The method of claim 15, wherein the parameters of the first tubular comprise:
a presence or absence of a box;
a length of the box, when the box is present;
a diameter of the box, when the box is present;
a diameter of a body portion;
a presence or absence of a sub attached at an end of the first tubular;
a length of the sub, when the sub is present;
a diameter of each end of the sub, when the sub is present;
a diameter of a body of the sub, when the sub is present;
a height, including the sub, above the fingerboard when the sub is present;
the height of the first tubular, without the sub, above the fingerboard when the sub is absent;
an overall length;
cleanliness;
visible markings; or
combinations thereof.

17. The method of claim 15, further comprising:
determining, via the rig controller, which one of the multiple slots of the fingerboard to store the first tubular based on the type of the first tubular;
storing the first tubular in the one of the multiple slots; and
determining, via the rig controller, a remaining portion of the total tubular storage space available to store additional tubulars when the first tubular is stored in the one of the multiple slots.

18. The method of claim 13, further comprising:
receiving multiple tubulars into the fingerboard;
collecting, via the cameras, one or more fourth images of each one of the multiple tubulars;
calculating, via the rig controller, parameters of each one of the multiple tubulars based on the fourth images and the calibrated vision system;
determining a type of each one of the multiple tubulars based on the parameters of each one of the multiple tubulars; and
logging the parameters and the type of each one of the multiple tubulars.

19. The method of claim 18, further comprising:
determining, via the rig controller, a respective storage location in the fingerboard for each one of the multiple tubulars based on the amount of time of utilization of each one of the multiple tubulars;
storing each one of the multiple tubulars in the respective storage location; and
logging, via the rig controller, the respective storage location for each one of the multiple tubulars; and
determining, via the rig controller, a remaining portion of the total tubular storage space of the fingerboard when the multiple tubulars are stored in the fingerboard.

20. The method of claim 19, further comprising:
logging historical information for each one of the multiple tubulars; and
planning, via the rig controller, future utilization of the multiple tubulars based on the historical information of each one of the multiple tubulars, wherein the historical information for each one of the multiple tubulars further comprises:
one or more positions in one or more tubular strings in which each one of the multiple tubulars have been utilized prior to the planning;
torque applied to the one or more tubular strings during the prior utilization;
weight on bit during the prior utilization;
environmental conditions during the prior utilization; or combinations thereof.

* * * * *

UNITED STATES PATENT AND TRADEMARK OFFICE
CERTIFICATE OF CORRECTION

PATENT NO. : 12,175,694 B2
APPLICATION NO. : 16/897650
DATED : December 24, 2024
INVENTOR(S) : Arima Ayanambakkam et al.

Page 1 of 1

It is certified that error appears in the above-identified patent and that said Letters Patent is hereby corrected as shown below:

In the Claims

In Column 18, Claim 1, Line 65, delete "ach" and insert --each--.

In Column 19, Claim 1, Line 2, delete "in" after "wherein" and before "the historical information".

In Column 19, Claim 1, Line 4, delete "tub lars" and insert --tubulars--.

Signed and Sealed this
Twenty-fifth Day of November, 2025

John A. Squires
*Director of the United States Patent and Trademark Office*